US006901830B2

(12) United States Patent
Kawatsu et al.

(10) Patent No.: US 6,901,830 B2
(45) Date of Patent: Jun. 7, 2005

(54) VERTICAL LATHE, TOOL HEAD FOR VERTICAL LATHE, ROTARY TABLE APPARATUS FOR MACHINE TOOL

(75) Inventors: Kazushi Kawatsu, Shizuoka-ken (JP); Hiromi Yamasaki, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/227,431

(22) Filed: Aug. 26, 2002

(65) Prior Publication Data

US 2003/0041708 A1 Mar. 6, 2003

(30) Foreign Application Priority Data

Aug. 30, 2001 (JP) ........................................ 2001-261887
Aug. 30, 2001 (JP) ........................................ 2001-261901
Aug. 30, 2001 (JP) ........................................ 2001-262012
Aug. 30, 2001 (JP) ........................................ 2001-262085

(51) Int. Cl.$^7$ .............................. B23B 3/20; B23B 9/00
(52) U.S. Cl. ............................ 82/122; 82/162; 409/235
(58) Field of Search ........................... 82/122, 149, 159, 82/121, 132; 29/26 R, 26 A, 27 R, 27 A, 27 C; 409/202, 212, 165, 166, 167; 74/813 R

(56) References Cited

U.S. PATENT DOCUMENTS

| 2,638,662 | A | * | 5/1953 | Rothwell | 29/34 D |
| 3,613,502 | A | * | 10/1971 | Wagner | 409/192 |
| 3,851,364 | A | * | 12/1974 | Noa et al. | 29/26 A |
| 4,118,844 | A | * | 10/1978 | Matsuzaki et al. | 29/27 C |
| RE31,304 | E | * | 7/1983 | Tsukiji | 29/27 C |
| 4,417,490 | A | * | 11/1983 | Mochizuki | 82/118 |
| 4,564,995 | A | * | 1/1986 | Kase | 29/563 |
| 4,719,830 | A | * | 1/1988 | Kawada et al. | 82/900 |
| 4,972,744 | A | * | 11/1990 | Sauter et al. | 29/35.5 |
| 5,678,291 | A | * | 10/1997 | Braun | 29/26 A |
| 5,699,598 | A | * | 12/1997 | Hessbruggen et al. | 29/27 C |
| 5,745,967 | A | * | 5/1998 | Kojima | 29/40 |
| 5,832,590 | A | * | 11/1998 | Wuerthner | 29/563 |
| 6,254,317 | B1 | * | 7/2001 | Chang | 409/212 |
| 6,428,453 | B1 | * | 8/2002 | Hoppe et al. | 409/212 |
| 6,711,804 | B2 | * | 3/2004 | Eicher | 29/563 |

FOREIGN PATENT DOCUMENTS

JP          05062037 A  *  3/1993  ........... G07B/11/03

* cited by examiner

Primary Examiner—A. L. Wellington
Assistant Examiner—Dana Ross
(74) Attorney, Agent, or Firm—Finnegan, Henderson, Farabow, Garrett & Dunner, L.L.P.

(57) ABSTRACT

In a vertical lathe of an open side column type, a pair of linear guides (65,66) arranged in parallel in a cross rail (62), and a space portion (67) is formed between them (65,66). A saddle (90) is supported by the linear guides (65, 66) above the space portion (67) and moved in an axis direction (X axis). A ram (120) is suspended through the space portion (67) and moved in a vertical direction (X axis). A rotary driving disc (34) fixed on the table rotation driving shalt (33) is connected to a rotary table (30) by plural torque transmission pins (37) in torque transmission relationship. Thereby, the rotary table (30) rotates in carrier method. A tool holder (151) is rotatably driven at an optional angle position (B axis position) by a B axis servomotor (163) about a horizontal axis. The tool holder (151) is clamped at an optional rotation angle position by a thrust static pressure bearing under oil-pressure supply to one of thrust static pressure portions. The tool angle is changeable by using the B axis servomotor (163).

13 Claims, 14 Drawing Sheets

VERTICAL LATHE, TOOL HEAD FOR VERTICAL LATHE, ROTARY TABLE APPARATUS FOR MACHINE TOOL

CROSS-REFERENCE TO RELATED APPLICATION

This application is based upon and claims the benefit of priority from the prior Japanese Patent Applications No. P2001-261887, No. P2001-161901, No. P2001-262085, and No. P2001-262012, filed Aug. 30, 2001.

BACKGROUND OF THE INVENTION

1. Field of the Invention

The present invention relates to machine tools, in particular, relates to a precision vertical lathe and a tool head for the precision vertical lathe for use in a precision working of Fresnel lens forming dies and the like, and also relates to a rotary table apparatus for use as a rotary working table in a precision machine tool such as the precision vertical lathe.

2. Description of the Related Art

A vertical lathe is well known as a machine tool to perform a turning process, for example. Such a vertical lathe has a rotary table arranged in horizontal direction, a saddle movably toward axis (movable in X axis) and mounted on a cross rail extending toward the diameter of the rotary table, a ram mounted in vertical direction (in Z axis direction) to the saddle, and a tool holder for holding tools fixed and located at the lower portion of the ram.

In the vertical lathe having the configuration described above, a work material is fixed on the rotary table, the turning process for the work material is performed by moving the ram in Z axis direction under the rotation of the rotary table. The X axis position of the tools is changed by moving the saddle in X axis direction so as to perform the turning process for the work material about the center of the rotation of the rotary table.

In the making of a Fresnel lens forming die by the turning process using the tools, a tilting angle or a lens surface given by the tilting angle of a convex shape in a concentric circle can be given by a tilting angle of a convex shape in a concentric circle of the work material to be turned by the tools.

Because the tilting angle of the lens surface (Fresnel surface) in the Fresnel lens is changed on the position in the radius direction of the lens, it is necessary to change the angle of the tool by the changeable tilting angle of the lens surface.

For this subject, the conventional vertical lathe having the above configuration cannot make Fresnel lens forming dies because the tools are fixed on the tool holder (or a tool box) and this tool holder is fixed and mounted at the lower portion of the ram and the angle of the tools cannot be changed by a servo control and the like.

Further, in the conventional vertical lathe, a linear guiding portion is mounted in front of (at one surface in vertical direction) the cross rail and the saddle is mounted on the linear guiding portion. The saddle is thereby moved in X axis direction.

In the vertical lathe having the above configuration, the weight of the saddle and the ram mounted on the saddle acts, as a load deviation, on the front portion of the cross rail. This causes a torsional deformation in the cross rail. This torsional deformation of the cross rail causes the decreasing of the movement accuracy of the saddle in X axis and thereby the decreasing of the working accuracy. Thus, the conventional vertical lathe cannot perform a super precision turning process required to satisfy a high-degree precision for the Fresnel lens forming dies and the like.

A rotary table apparatus used in machine tools such as the vertical lathe described above has a base body as a fixed portion and a rotary table as a rotary portion. The rotary table is rotatably supported around the vertical axis on the base body by a radial roller bearing and a thrust roller bearing of a large diameter corresponding to the diameter of the rotary table.

The rotation driving or the rotary table is performed by engaging the ring gear of a large diameter fixed on the rotary table with a small gear of a small diameter in a driving side and by an electric motor for the rotary-driving of the rotary table through the gear train of this small gear.

In the conventional rotary table apparatus, the vibration caused by the electric motor and the gear train is propagated to the rotary table during the rotary driving of the rotary table by the electric motor. It is thereby impossible to achieve a high rotary accuracy. The relative assembling errors between the rotary table and a power transmission system prevents the transmission of the rotary power of the electric motor as a complete torque to the rotary table. The power deviation acts thereby on the rotary table. This causes the decreasing of the rotary accuracy of the rotary table.

In the conventional rotary table apparatus, because the rotary table is supported with a roller bearing, the rotary table vibrates during the rotation of the rotary table. This also decreases the rotary accuracy of the rotary table.

Because the rotary accuracy of the rotary table affects the working accuracy, it is impossible for the conventional rotary table apparatus used in the conventional machine tools to perform the super turning process with a high-working accuracy such as the turning process for Fresnel lens forming dies and the like.

SUMMARY OF THE INVENTION

Accordingly, an object of the present invention is, with due consideration to the drawbacks of the conventional technique, to provide a machine tool, for example a vertical lathe, capable of performing a turning process for a work material by a simple operation with a high precision accuracy required to a change of the angle of each tool according to a working position for the formation of Fresnel lens forming dies.

A further object of the present invention is to provide a vertical lathe capable of preventing any occurrence of a torsional deflection in a cross rail, of having a high movable accuracy of a saddle in X axis, and of performing the turning process with a high accuracy.

A still further object of the present invention is to provide a rotary table apparatus for use in machine tools capable of suppressing a vibration of the rotary table, or transferring a rotary power to the rotary table as a complete torque without a stress deviation, and of performing a turning process with a super accuracy required to the processes of a high precision while keeping a high rotation accuracy.

In order to achieve the above objects, a vertical lathe according to an aspect of the present invention has a base body, a rotary table, an upper structural body, a saddle, a ram, a tool holder, a tool holder rotation driving mechanism, and a tool holder clamp mechanism. The rotary table is rotatably mounted about a vertical shaft on the base body by a first rotation driving mechanism. The upper structural body has a column and a cross rail of an overhang type located in parallel to the rotary table. The saddle is movably mounted in a longitudinal direction of the cross rail and driven in axis direction by a first axis feed mechanism. The ram is movably mounted at the saddle in a vertical direction and driven in axis direction by a second axis feed mechanism. The tool holder holds tools and rotatably mounted about a horizontal axis at the lower portion of the ram. The tool holder rotation driving mechanism as a second rotation driving mechanism drives to rotate the tool holder at a desired rotation angle. The tool holder clamp mechanism clamps the tool holder at an optional rotation angle.

In the vertical lathe described above, the rotary table is rotated about the vertical shaft in horizontal direction. The saddle is moved in axis direction (X axis) in the vertical lathe of a single column type (an open side column type). The ram is moved in vertical direction (Z axis). The tool holder is rotated about the horizontal axis at an optional rotation angle position (B axis position) by the tool holder rotation driving mechanism. The tool holder clamp mechanism clamps the tool holder at an optional rotation angle. Thereby, it is possible to change the tool angle by an instruction signal to be transferred to the tool holder rotation driving mechanism.

Further, in the vertical lathe according to an aspect of the present invention, the linear guide mechanism of the saddle can be formed with a finite V—V roller guide. In the finite V—V roller guide, a plurality of needle rollers are mounted at a same interval by a roller holding gage of a V-shaped section having a predetermined length in movable direction. The finite V—V roller guide is arranged between linear guiding rails having V-shaped section in the cross rail and the saddle engaged to each other. When compared with the circulation roller guide, the finite V—V roller guide has a feature of a high movement accuracy such as a high rigid, a low friction, and an infinitesimal waviness.

In addition, the upper structural body in the vertical lathe according to an aspect of the present invention has an integral casting configuration in which the column and the cross rail are formed in one body. Thereby, the upper structural body has a high rigid and a high accuracy in mounting position because the lower end portion of the column can be fixed on the base body.

Moreover, the cross rail in the vertical lathe according to an aspect of the present invention has a pair of linier guides arranged in parallel to each other, and a space portion is formed between the linear guides. The saddle is supported above the space portion by a pair of the linear guides. The ram is suspended extending to the vertical direction through the space portion. By this configuration described above, no eccentric load caused by the weight of both the saddle and the ram act on the cross rail and no torsional deflection occurs in the cross rail.

In addition, the vertical lathe has a microscope for detecting a tip of each tool attached to the tool holder.

The vertical lathe according to an aspect of the present invention further has a rotary table clamp mechanism and a linear table unit. The rotary table clamp mechanism clamps the rotary table at an optional angle position. The linear table unit is detachably mounted on the rotary table. The linear table unit has a fixed base and a linear table. The fixed base is detachably fixed on the rotary table. The linear table is mounted on the fixed base and movable in reciprocal motion. The linear table is moved in axis direction by a third axis feed mechanism. It is thereby possible for the vertical lathe to perform a planing process.

Further, the vertical lathe according to an aspect of the present invention has a cross rail support portion rotatably placed about the vertical axis and selectively holds the tip ends of the cross rail. When the cross rail support portion selectively supports the tip end portions of the cross rail, it is possible to increase an apparent rigid of the cross rail in the vertical lathe of the open side column type.

Moreover, in order to achieve the above objects, a vertical lathe according to an aspect of the present invention has a rotary table mounted in horizontal direction, a saddle movably mounted in the longitudinal direction of the cross rail, a ram mounted in vertical direction of the saddle, and a tool holder fixed and attached to the lower end portion of the ram. In the vertical lathe described above, the cross rail has a pair of linear guides arranged in parallel to each other on the front surface portion of the cross rail. A space portion is formed between the linear guides. The saddle is supported above the space portion by a pair of the linear guides. The ram is suspended extending to the vertical direction through the space portion.

Still furthermore, in the vertical lathe of an aspect of the present invention, both the sides of the saddle is supported by a pair of the linear guides above the space portion between the linear guides, and the ram is suspended through the space portion. Thereby, because the weight of the saddle and the ram act uniformly on a pair of the linear guides, no eccentric load caused by the weight of the saddle and the ram act on the cross rail. No torsional deflection occurs in the cross rail.

Furthermore, in order to achieve the above objects, a tool head for a vertical lathe according to an aspect of the present invention is a tool head attached to the lower end portion of a ram in the vertical lathe. The tool head has a tool holder axis, a tool holder, a servomotor, and a clamp mechanism. The tool holder axis is rotatable about a horizontal axis. The tool holder is attached to the tool holder axis and has a tool setting portion to which tools are releasably attached. The servomotor rotatably drives the tool holder axis at an optional rotation angle. The clamp mechanism clamps the tool holder axis at an optional rotation angle.

In addition, according to the tool head for the vertical lathe of an aspect of the present invention, the tool holder axis is rotatably driven at a predetermined rotation angle and the clamp mechanism clamps the tool holder axis at a predetermined rotation angle. It is thereby possible to change the angle of a tool such as a tool attached to the tool setting portion in the tool holder by transferring a control signal to the servomotor.

Further, the tool holder axis in the tool head for the vertical lathe according to an aspect of the present invention is rotatably supported by a static pressure bearing. The static pressure bearing includes a radial static pressure support portion and right and left thrust static pressure portions arranged in opposed position at the flange formed in a middle portion of the tool holder axis. The static pressure bearing has a rotation maintain mode and a clamp mode. In the rotation maintain mode a fluid generating a fluid pressure is supplied to both the right and left thrust static pressure portions. In the clamp mode a fluid generating a fluid pressure is supplied to one of the right and left thrust static pressure portions. The static pressure bearing acts as the clamp mechanism.

Moreover, in the tool head for the vertical lathe according to an aspect of the present invention, the tool holder has a plurality of the tool setting portions arranged in radical shape and formed in a turret type.

Still furthermore, the tool head for the vertical lathe according to an aspect of the present invention has a fine adjusting mechanism of a wedge type capable of performing a fine adjustment of the setting position of the tools attached to the tool setting portion.

Furthermore, in order to achieve the above objects, a rotary table apparatus for use in a machine tool according to an aspect of the present invention has a base body, a rotary table, a table rotation driving shaft, a rotation driving disc, a plurality of torque transmission pins, and a table rotation driving mechanism. The rotation table is rotatably mounted about the vertical axis on the base body. The table rotation driving shaft is supported in vertical direction on the base body and rotatably about the rotation center axis of the rotary table. The rotation driving disc is fixed to the table rotation driving axis. The torque transmission pins is put in mating holes formed in the rotary table and through the mating holes the rotation driving disc is engaged to the rotary table. The table rotation driving mechanism is connected to the table rotation driving shaft in order to drive this table rotation driving shaft.

Further, in the rotary table apparatus for use in a machine tool according to an aspect of the present invention, the rotation of the rotation driving disc is transmitted to the rotary table through torque transmission pins. The rotary table can rotate by carriet method.

In addition, the table rotation driving mechanism in the rotary table apparatus for use in a machine tool according to an aspect of the present invention includes an electric motor placed at an external base. A first timing pulley attached to the output axis of the electric motor is coupled to a second timing pulley attached to the table rotation driving shaft through an endless timing belt.

Moreover, in the rotary table apparatus for use in a machine tool according to an aspect of the present invention, the rotary table is rotatably supported on the base body in an oil static pressure sliding state by the oil static pressure bearing.

Further, the oil static pressure bearing supporting the rotary table apparatus includes a radial static pressure support portion, an upper thrust static pressure support portion and a lower thrust static pressure support portion which are oppositely arranged back to back in upward and downward direction. The oil static pressure bearing includes a rotation maintain mode and a clamp mode. In the rotation maintain mode an oil generating an oil pressure is supplied to both the upper and lower thrust static pressure support portions. In the clamp mode an oil generating an oil pressure is supplied to one of the upper and lower thrust static pressure support portions.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of this invention will become apparent through the following description of preferred embodiments which are given for illustration of the invention and are not intended to be limiting thereof.

Hereinafter, a description will be given to a detailed explanation of embodiments of the present invention with reference to attached diagrams.

Embodiment (Entire Configuration)

Figure 1:
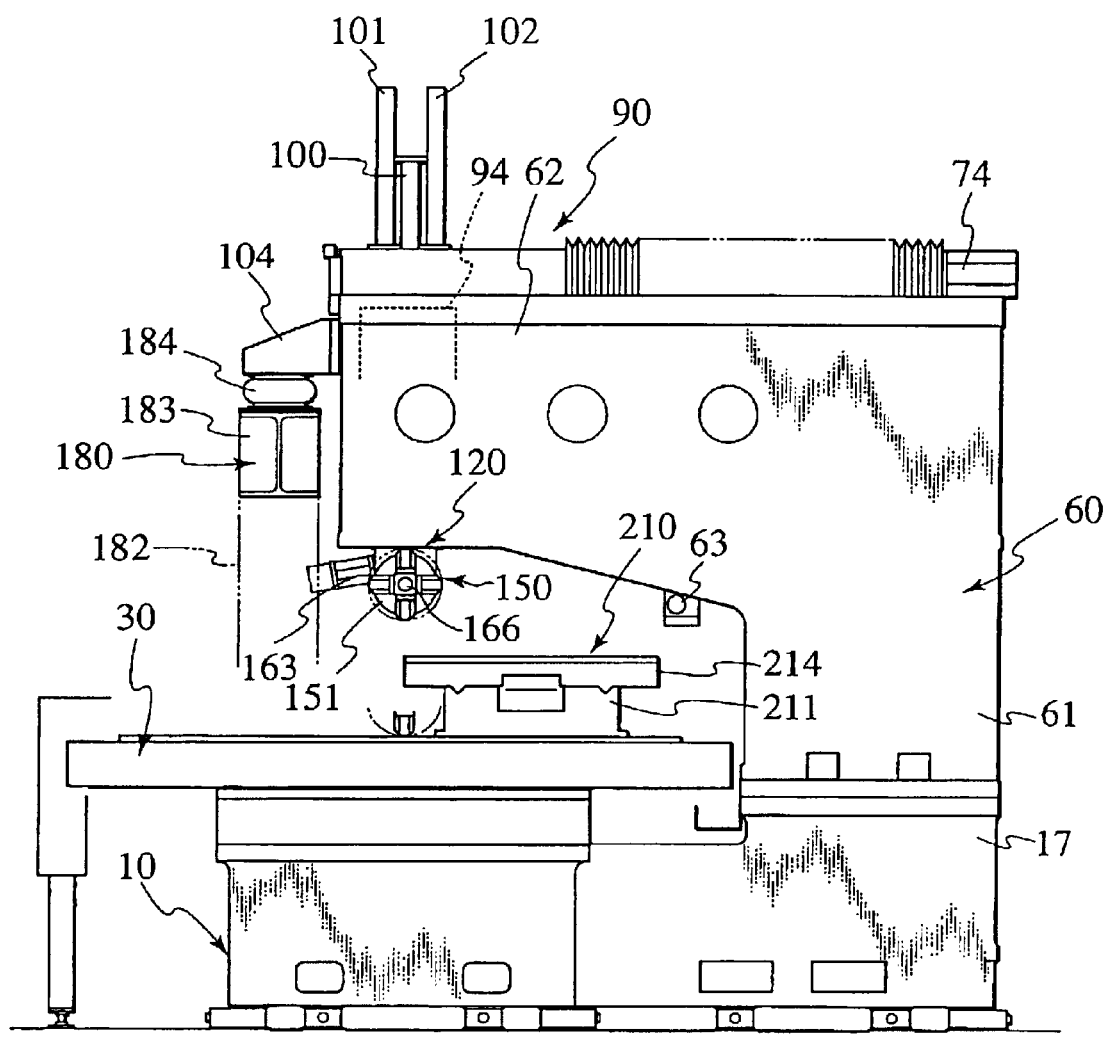
FIG. 1 is a front view showing the entire configuration of a vertical lathe according to an embodiment of the present invention.
Figure 2:
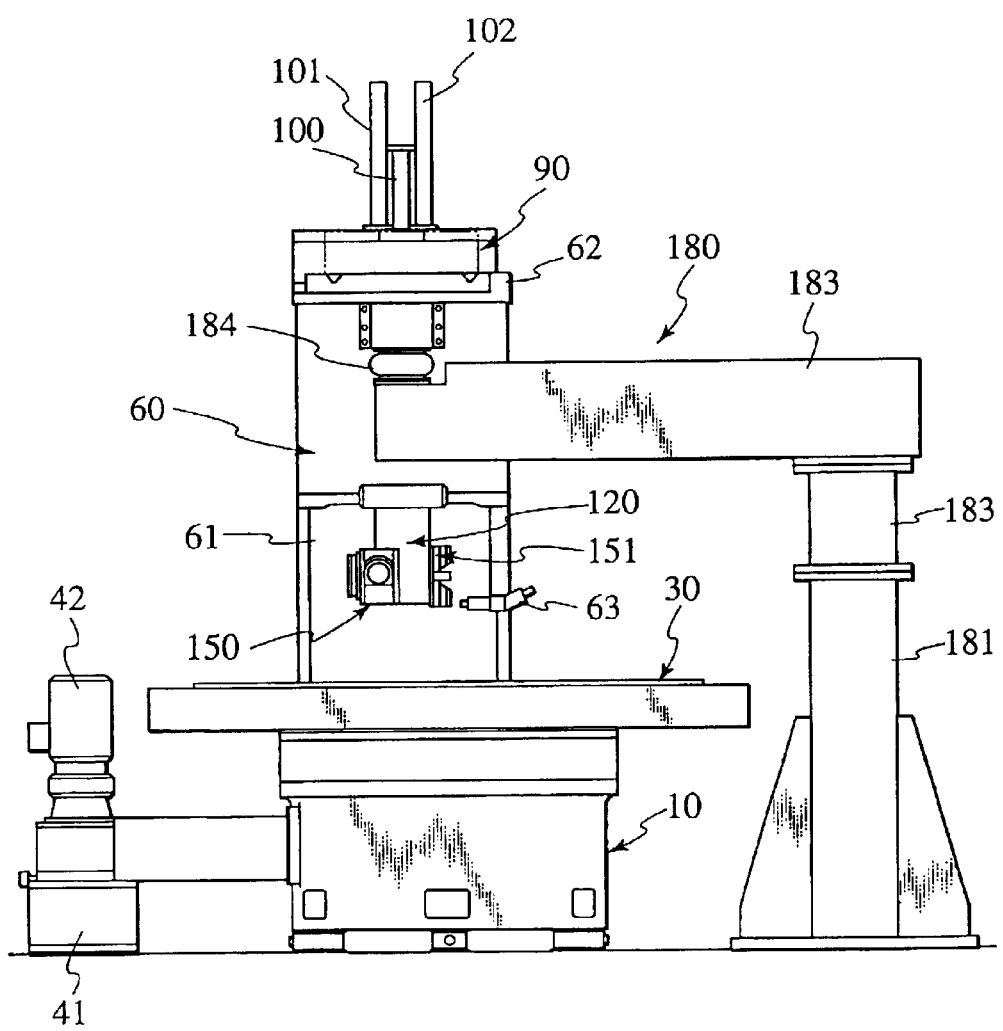
FIG. 2 is a side view showing the entire configuration of the vertical lathe according to an embodiment of the present invention.
Figure 3:
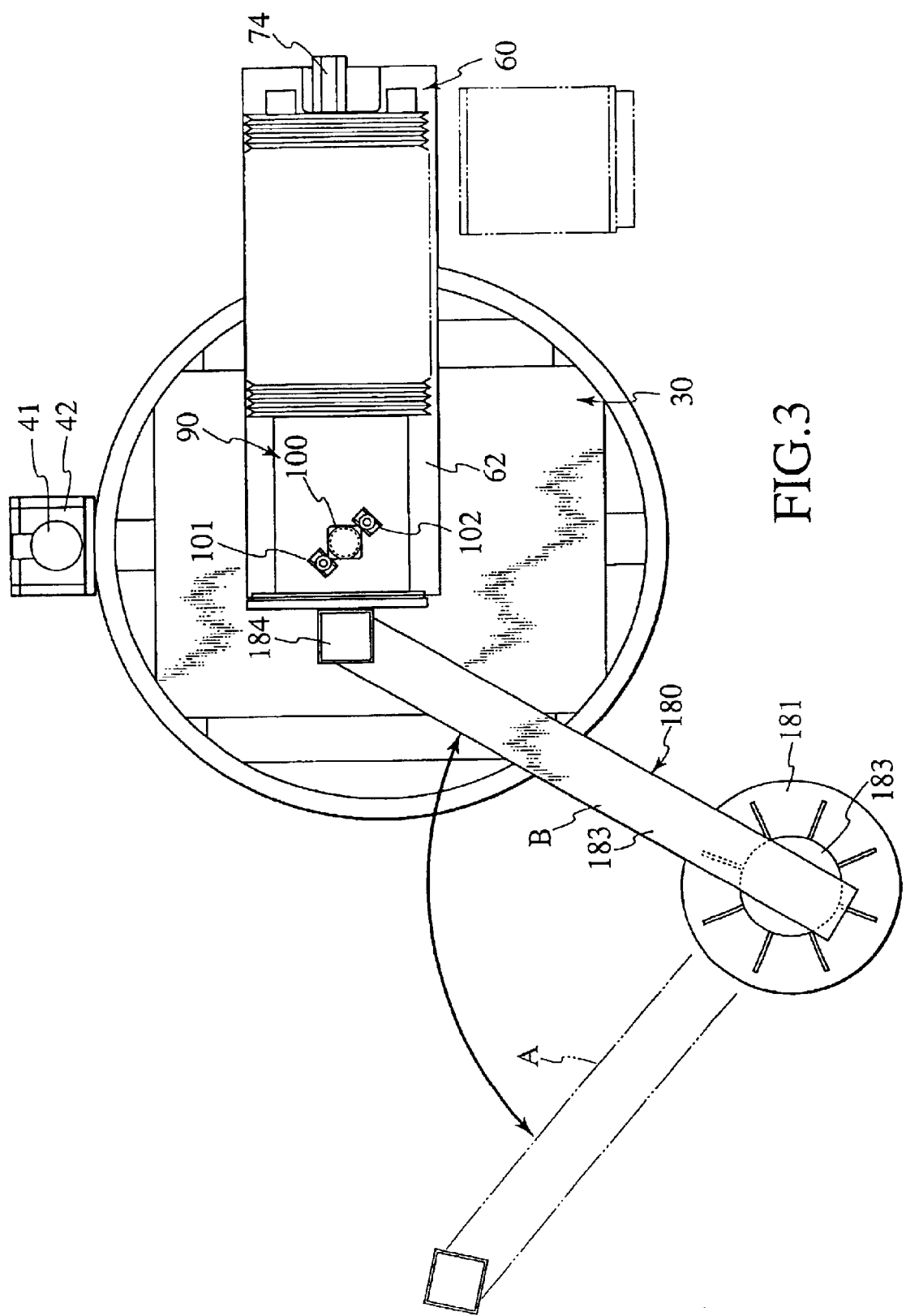
FIG. 3 is a plan view showing the entire configuration of the vertical lathe according to an embodiment of the present invention.

As shown in FIG. 1 to FIG. 3, a vertical lathe is comprised of a base body 10, a rotary table 30, an upper structure body 60, a saddle 90, a ram 120, a tool head (swivel head) 150, a cross rail support portion 180, and a linear table unit 210. The rotary table 30 is rotatably mounted on the base body 10 about a vertical axis. The upper structure body 60 is comprised of a column 61 and a cross rail 62 of an over-hang type, placed in parallel to the rotary table 30, extending from the upper side of the column portion 61 in horizontal direction. The saddle 90 is movably mounted in the cross rail 62 in extending direction (X axis direction) of the cross rail. The ram 120 is movably mounted in the saddle 90 in vertical direction (Z axis). The tool head 150 (swivel head) is rotatably mounted about horizontal axis (B axis) under the lower side portion of the ram 120, and the tool head 150 includes a tool holder 151 for holding tools. The cross rail support portion 180 is rotatably mounted about vertical axis and selectively holds the end portion of the cross rail 62. The linear table unit 210 is releasably attached to the rotary table 30.

A microscope 63 is attached to the upper structure body 60 in order to detect the position of the tip of the tool attached to the tool holder 151.

(Rotary Table)

Figure 4:
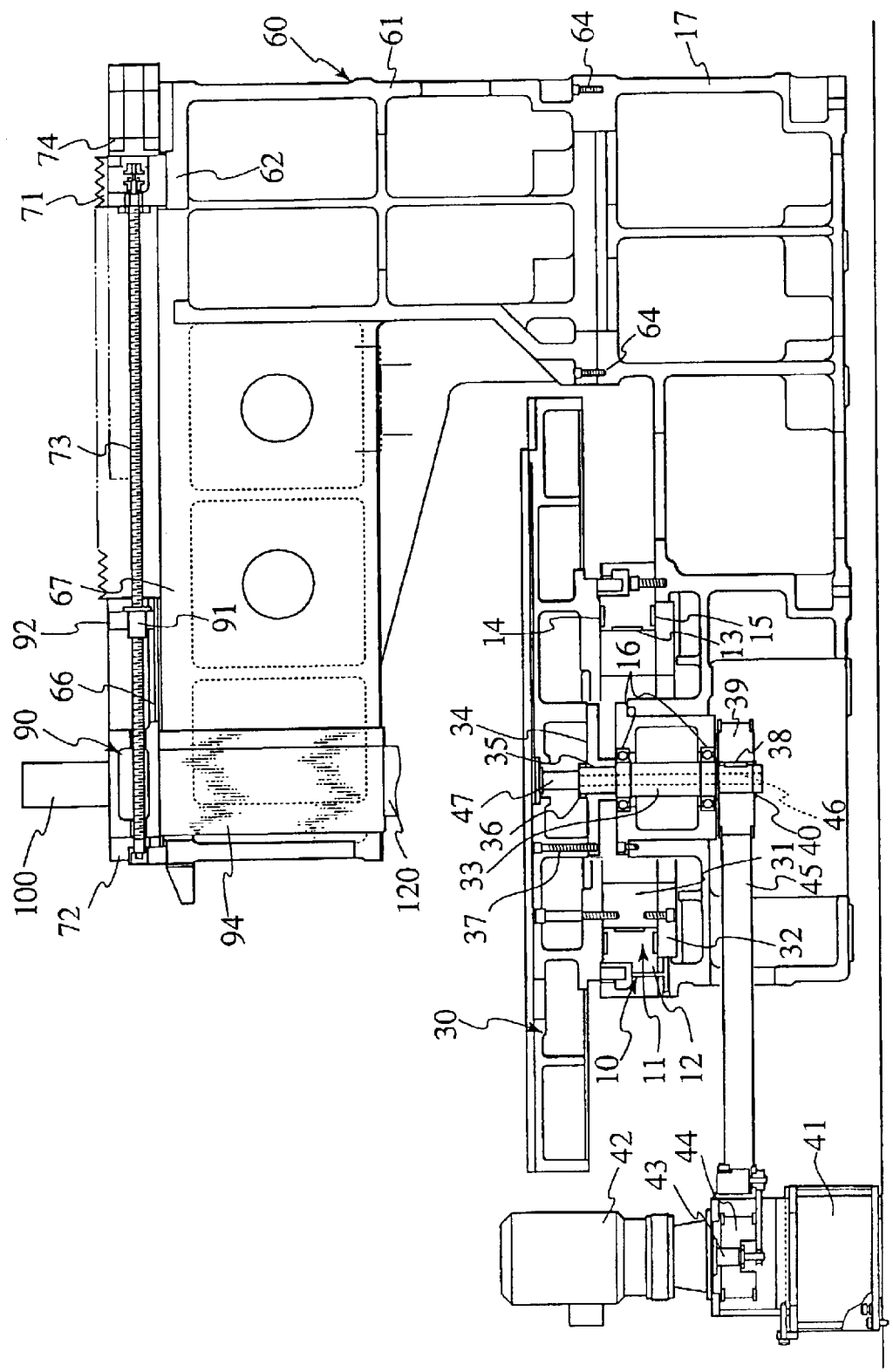
FIG. 4 is an assembling diagram of a base body, a rotary table, and an upper structure body of the vertical lathe according to an embodiment of the present invention.

As shown in FIG. 4, the rotary table 30 is supported about vertical axis on the base body 10 by the oil static pressure bearing 11. The oil static pressure bearing 11 has a ring member 12 fixed onto the upper portion of the base body 10. Thereby, a radial static pressure pocket 13 is formed between the inner surface of the ring member 12 and the outer surface of a ring member 31 fixed to the bottom portion of the rotary table 30.

Further, in the oil static pressure bearing 11 an upper thrust static pressure pocket 14 is formed between the upper surface of the ring member 12 and the bottom surface of the rotary table 30 and a lower thrust static pressure pocket (lower side thrust static pressure support portion) 15 is also formed between the lower surface of the ring member 12 and the upper surface of the ring member 32 fixed onto the bottom portion of the ring member 31. The upper thrust static pressure pocket 14 and the lower thrust static pressure pocket 15 forms an oil static pressure bearing of opposed type which are oppositely arranged back to back in upward and downward direction.

In the rotary table rotation mode, an oil pressure is supplied to both the upper thrust static pressure pocket 14 and the lower thrust static pressure pocket 15. In addition, an oil generating an oil pressure is supplied to one of them during the rotary table clamp mode in order to clamp the rotary table 30 on the base body 10 by the oil pressure of the static bearing portion. Accordingly, in the rotary table rotation mode the oil generating the oil pressure is supplied to both the static pressure pockets 14 and 15. In the rotary table clamp mode, the oil generating the oil pressure is supplied only to the selected one in order to clamp the rotary table 30 on the base body 10.

That is, the oil static pressure bearing 11 acts as a rotary table clamp mechanism to clamp the rotary table 30 at an optional rotation angle.

The base body 10 supports the table rotation driving shaft 33 mounted in vertically axis by a rolling bearing member 16. A rotary driving disc 34 is engaged with the upper portion of the table rotation driving shaft 33 by a key 35 in a torque transmission relationship and fixed by a fix member 36.

The rotary table 30 is connected to the rotary driving disc 34 through a plurality of torque transmission pins 37 (for example, the number is approximately four, but only one of them is shown in FIG. 4)

It is acceptable to form both the rotary driving disc 34 and the table rotation driving shaft 33 in one integral formation.

Figure 17:
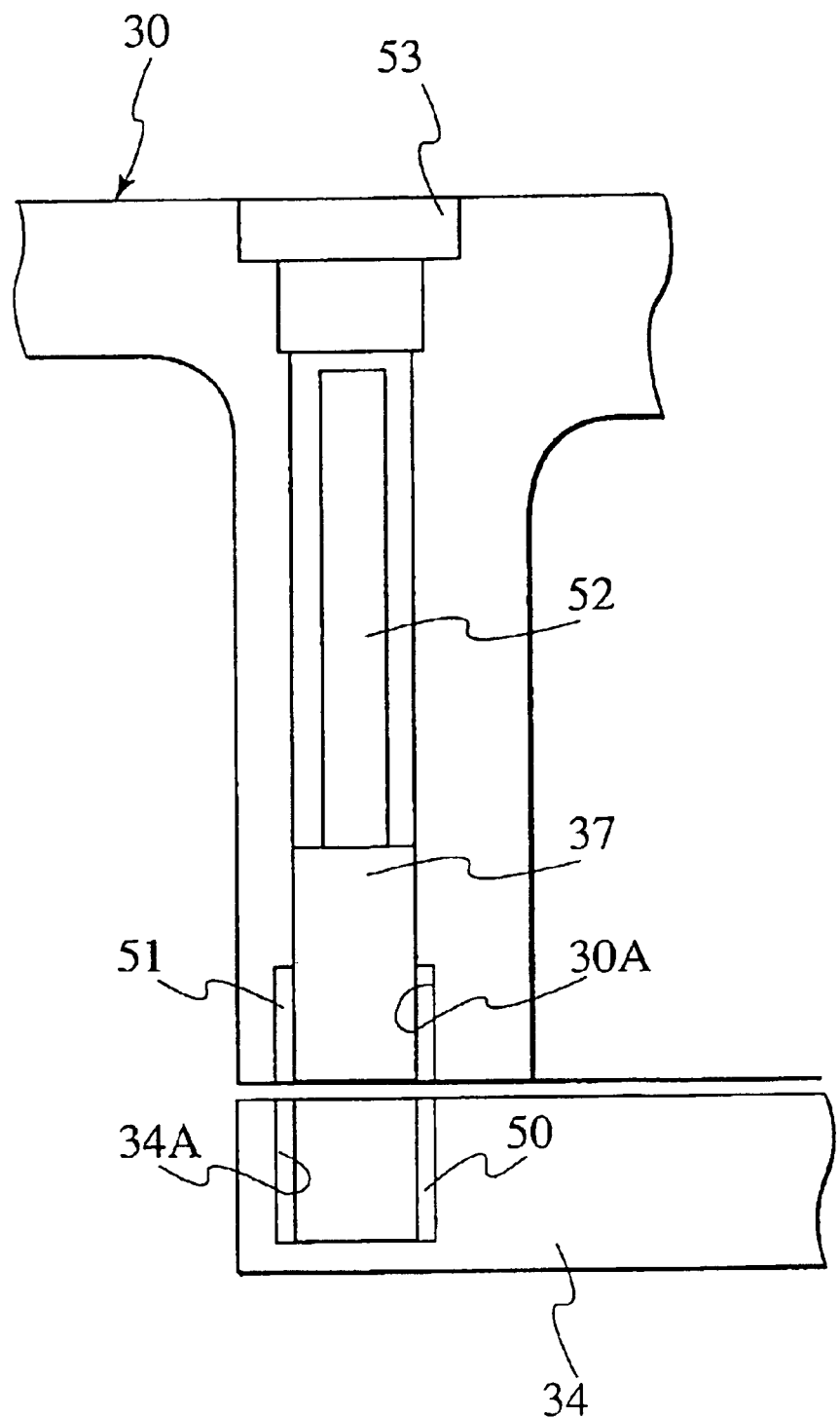
FIG. 17 is an enlarged sectional view showing a main portion of a rotary table driving mechanism in a rotary table apparatus according to an embodiment of the present invention.

As clearly shown in FIG. 17, a plurality of mating holes 30A and 34A are formed in both the rotary driving disc 34 and the rotary table 30 every one rotary angle (for example, every 90 angle interval) in a concentric circle.

Bushes 50 and 51 of high-lubricasting resin are inserted into the mating holes 30A and 34A, respectively. One end portion of the torque transmission pin 37 is inserted into the bush 50 and the other end portion of the torque transmission pin 37 is inserted into the bush 51.

In other words, one end of the torque transmission pin (carriet) 37 is inserted into the bush 50 in the rotary driving disc 34 and the other end of it is inserted into the bush 51 of the rotary table 30 in order to connect the rotary driving disc 34 to the rotary table 30 in torque transmission relationship. A shank rod 52 is attached to the torque transmission pin 37 in order to take out the torque transmission pin 37.

The upper portion of the mating hole 30A in the rotary table 30 is closed by a plug 53 in order to prevent invasion of foreign substances.

Although FIG. 17 shows only one torque transmission pin 37, the number of the torque transmission pins 37 is four in an actual case, which are arranged at 90 angle interval.

As shown in FIG. 4, a timing pulley 39 is engaged with the lower end portion of the rotary table driving shaft 33 through the key 38 in torque transmission relationship and fixed by a fix member 40.

A motor base 41 is placed and separated in position from the base body 10 of the vertical lathe for preventing heat transfer. The table driving motor 42 is mounted on the motor base 41. A timing pulley 44 for use in driving is fixed to the output axis 43 of the table driving motor 42. An endless timing belt 45 is stretched between the timing pulleys 39 and 44.

By using the power transmission mechanism described above, both the table rotary driving shaft 33 and the rotary driving disc 34 connected to the shaft 33 are rotated. The rotation power is transferred to the rotary table 30 through the torque transmission pin 37. The rotary table 30 thereby rotates about the table rotary driving shaft 33 in the carriet method.

Because the rotary table 30 rotates based on the carriet method, only the torque is transferred to the rotary table 30 from the rotary driving disc 34. Thereby, any vibration and deviation power are not transferred to the rotary table 30. Further, the rotary table 30 can rotate on the base body 10 by the oil static pressure bearing 11 under oil static pressure sliding state.

As described above, it is possible to suppress the occurrence of the vibration in the rotary table 30, to transfer the rotation power to the rotary table 30 as a complete torque, to avoid any deviation power to the rotary table 30, to keep a high rotation accuracy, and to perform a high precision turning process for machining with a high accuracy.

Figure 14:
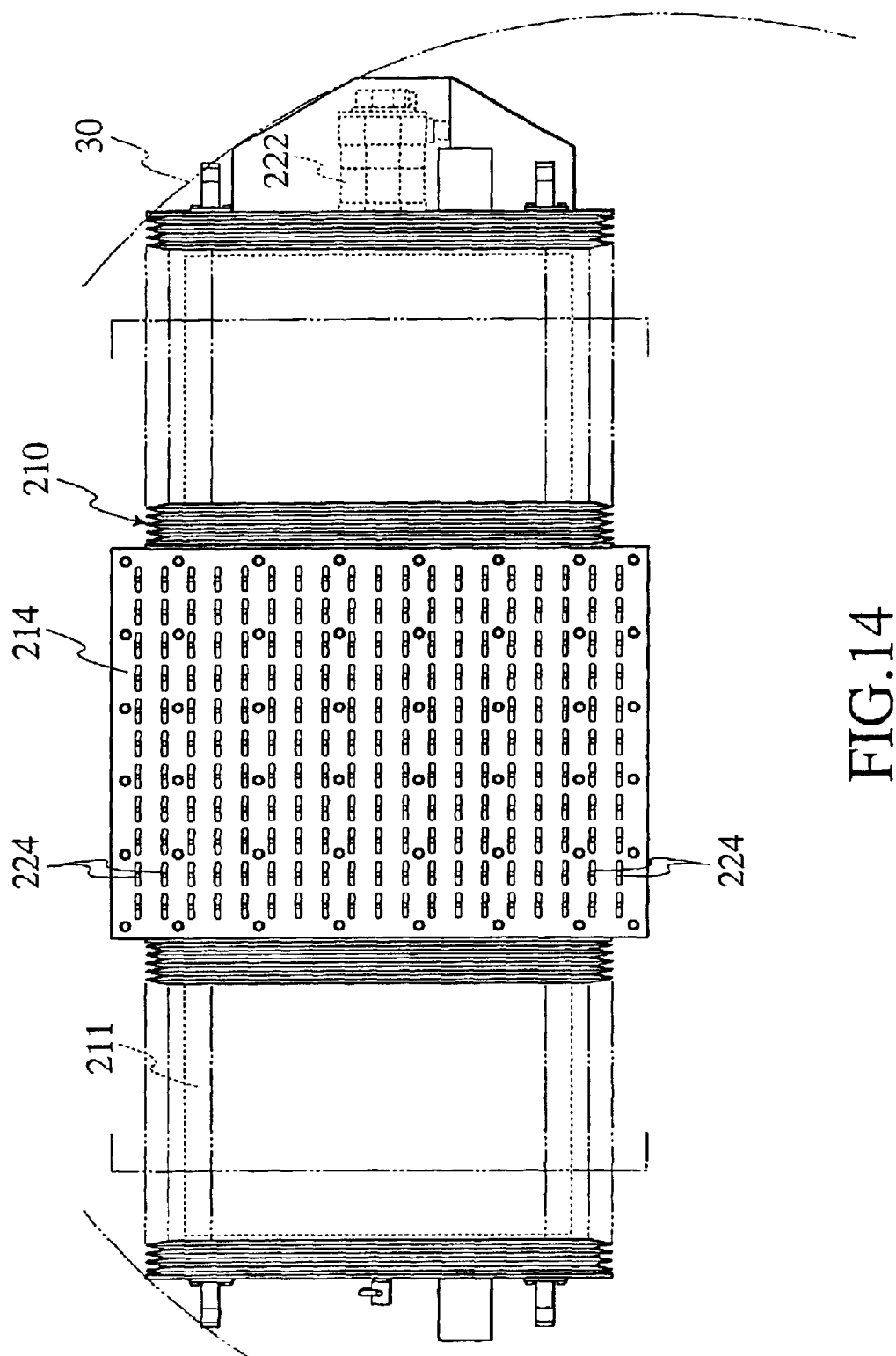
FIG. 14 is a plan view of a linear table unit for use in the vertical lathe according to an embodiment of the present invention.

By the way, the rotary table 30 has a plurality of vacuum chuck openings 224 (not shown in FIG. 4, but shown in FIG. 14). Those vacuum chuck openings 224 form a vacuum chuck by which a work material (works) and the linear table unit 210 as an additional stage are fixed by the vacuum pressure. The vacuum pressure can be supplied through a hollow hole 46 of the table rotary driving shaft 33 and a rotary coupling 47 formed between the upper end portion of the table rotary driving shaft 33 and the rotary table 30.

(Upper Structure Body)

As shown in FIG. 4, the upper structure body 60 is comprised of the column 61 and the cross rail 62 formed in an integral casting configuration. By this integral casting configuration, the lower end portion of the column 61 can be tightly fixed by bolts 64 onto a side extending portion 17 formed with the base body 10 in the integral casting configuration. This configuration is the vertical lathe of an open side column type.

Because the upper structure body 60 has the integral casting configuration in which the column 61 and the cross rail 62 are formed in an integral body, it is possible to obtain a high rigid. Because the lower end portion of the column 61 is fixed on the side extending portion 17 formed in the integral casting configuration with the base body 10, it is possible to obtain a high assembling accuracy in position.

(Saddle)

As shown in FIG. 4 to FIG. 9, the cross rail 62 is comprised of a pair of linear guides 65 and 66 arranged in parallel to each other. A space portion 67 is formed between the linear guides 65 and 66. A saddle 90 is supported by a pair of the linear guides 65 and 66 placed above the space portion 67. A linear guide for the saddle 90 in the linear guides 65 and 66 is formed with a finite V—V roller guide 68. By this configuration no load deviation acts on the cross rail 62 by the weight of the saddle 90 and the ram 120, and no torsional deflection occurs in the cross rail 62. This can increase a movement precision of the saddle 90 in X axis direction and can thereby perform the high precision turning process required to the turning processes, for example, the formation process of Fresnel lens forming dies and the like.

In the finite V—V roller guide 68, a plurality of needle rollers 70 are mounted at a same interval by a roller holding gage 69 of a V-shaped section having a predetermined length in movable direction. The finite V—V roller guide 68 is arranged between linear guide rails 62A and 90A having V-shaped section in the cross rail 62 and the saddle 90 engaged to each other. The use of the finite V—V roller guide 68, it is possible to obtain a high movement accuracy such as a high rigid, a low friction, and an infinitesimal waviness when compared with a circular roller guide.

For the reason above, the machine tool including the vertical lathe using the rotary table according to the present invention can perform a super precision turning processes such as the turning process to form Fresnel lens forming dies and the like requiring a high working precision.

A X axis feed screw rod 73 of a ball screw type, whose both ends are rotatably supported by both bearing brackets 71 and 72, is mounted on the cross rail 62. A ball nut 91 is mounted on the saddle 90 by a parallel spring member 92. The ball nut 91 is engaged with the X axis feed screw rod 73. The X axis feed screw rod 73 is connected to the X axis servomotor 74 mounted on the cross rail 62 and is rotatably driven by the X axis servomotor 74. The saddle 90 is thereby moved toward X axis direction by the X axis servomotor 74.

The parallel spring member 92 is a kind of a flexibility coupling having a high rigid in axis feed direction by its thickness and having an elastic deformation function against a movement by thin-thickness bridge portions 93 formed in upward and downward portions and in right and left portions. The parallel spring member 92 has a function to absorb a bend of the ball screw and an angle misalignment between the X axis feed rod 73 and the ball nut 91 and can thereby reduce the fluctuation caused by the rotation of the ball screw.

Figure 8:
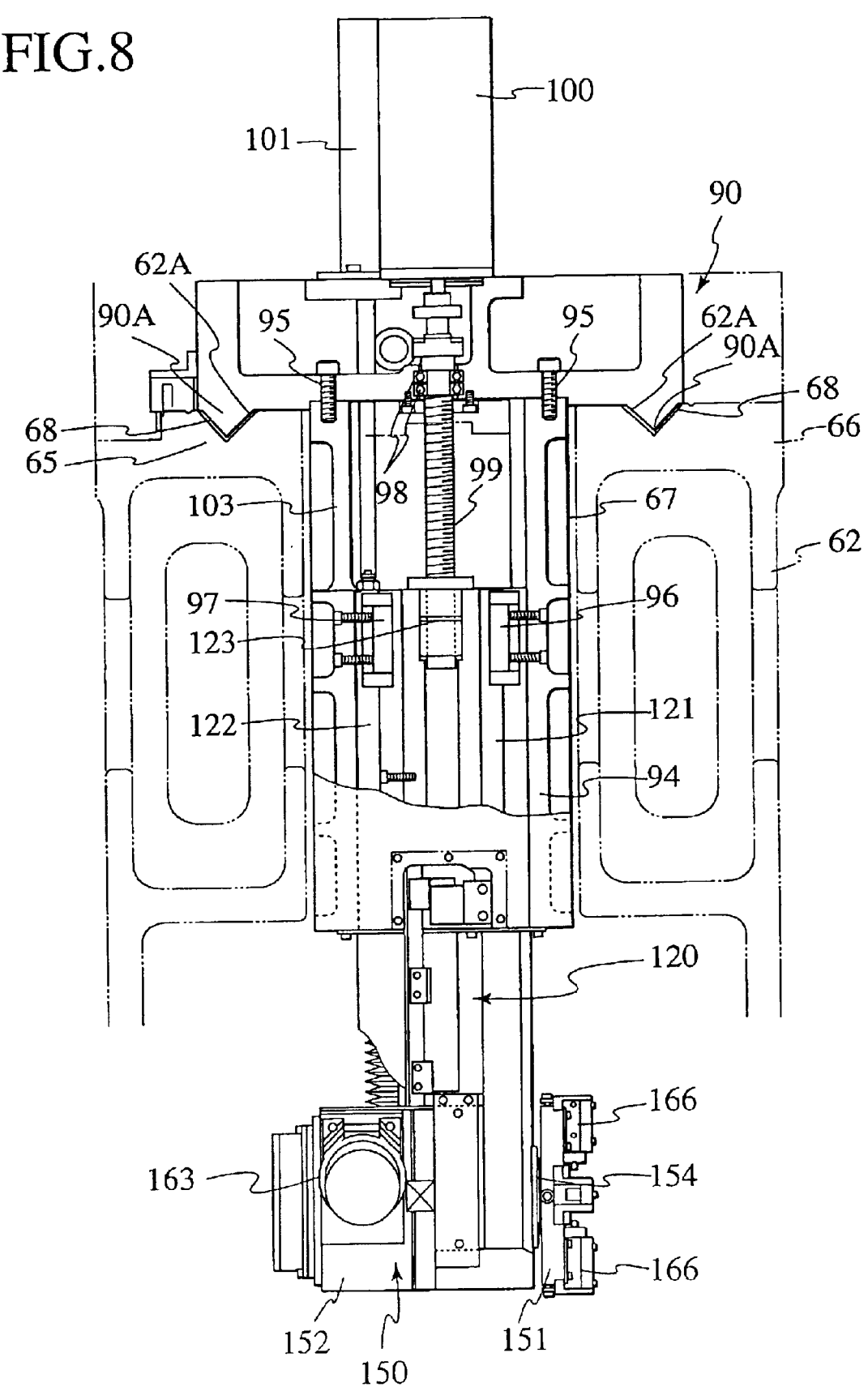
FIG. 8 is a diagram showing a vertical section of the saddle and ram in the vertical lathe according to an embodiment of the present invention.
Figure 9:
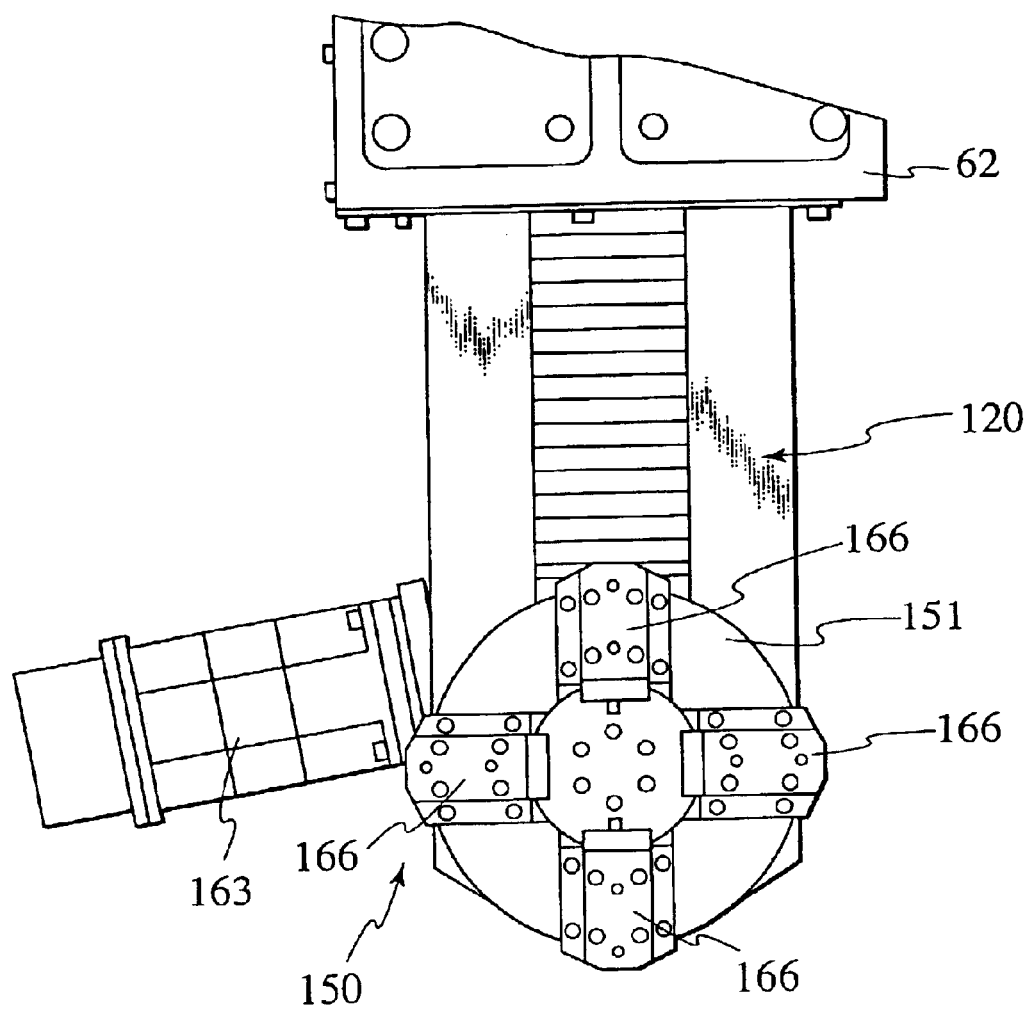
FIG. 9 is a front view of a lower end portion of the ram and a swivel head portion in the vertical lathe according to an embodiment of the present invention.
Figure 10:
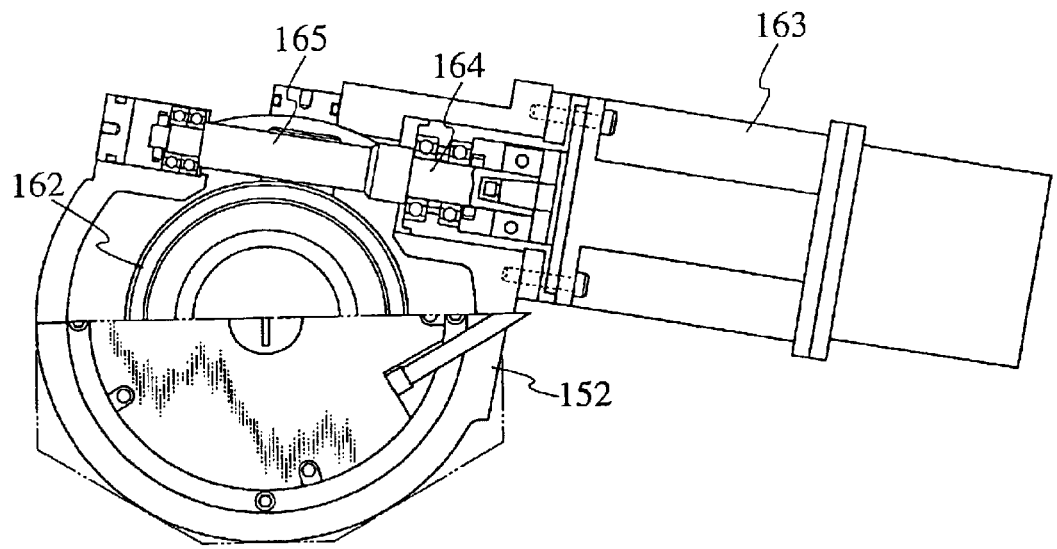
FIG. 10 is a diagram showing a half section of the swivel head in the vertical lathe according to an embodiment of the present invention.
Figure 11:
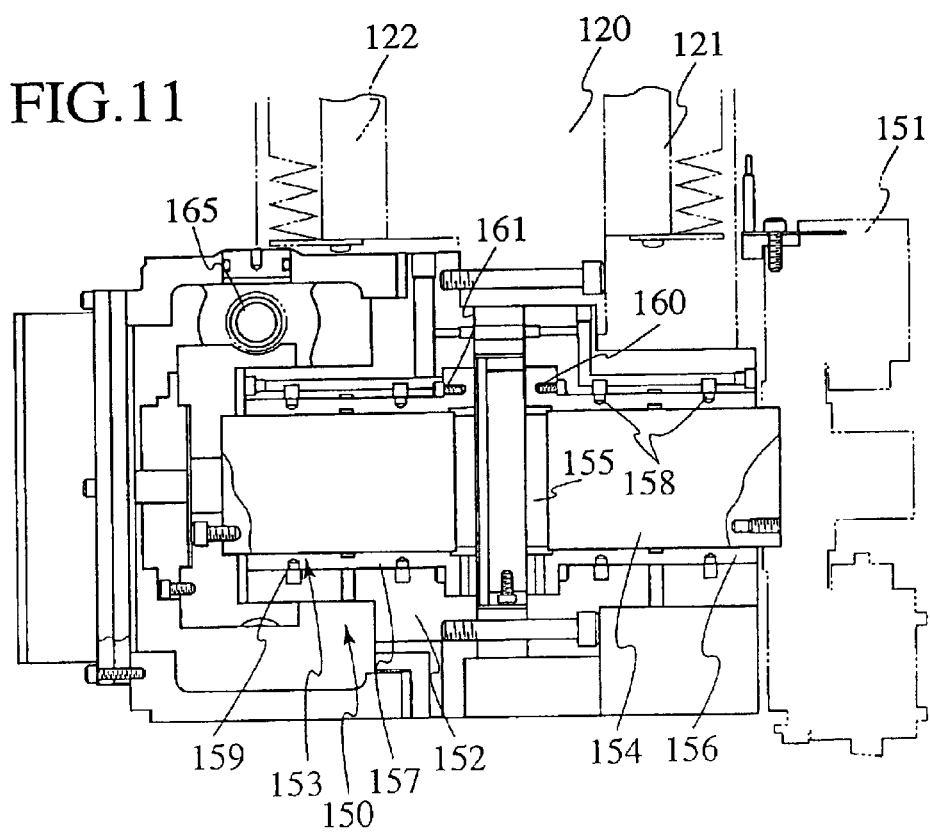
FIG. 11 is a diagram showing a vertical section of the swivel head in the vertical lathe according to an embodiment of the present invention.
Figure 12:
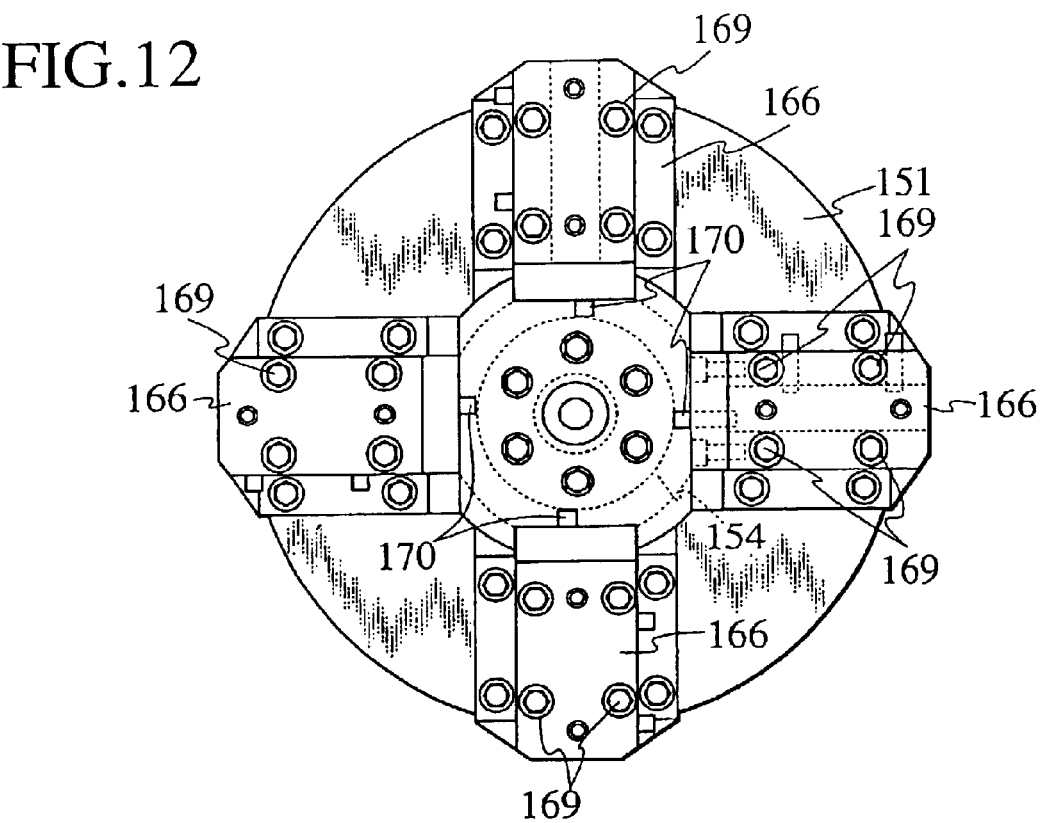
FIG. 12 is a front view of a tool holder in the vertical lathe according to an embodiment of the present invention.
Figure 13:
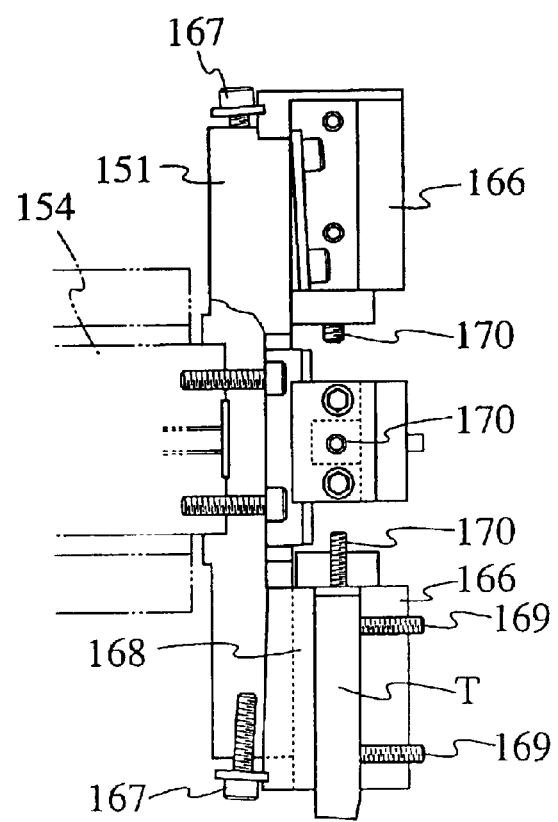
FIG. 13 is a side view of the tool holder in the vertical lathe according to an embodiment of the present invention.

As shown in FIG. 8, a ram guiding member 94 having a rectangular hollow shape is suspended and fixed at the bottom portion of the saddle 90 by bolts 95 (see FIG. 8). The ram guide member 94 is positioned in the space portion 67 in the right and left linear guides (X axis V—V guide surface) 65 and 66 and contains the ram 120 therein.

Z axis guide rails 121 and 122 are fixed at both the ends of the rain 120. Linear guide members 96 and 97 engaged with the corresponding Z axis guide rails 121 and 122 are fixed in the ram guide member 94. The linear guide members 96 and 97 are made by a circular roller guide way and the like. The ram 120 is thereby moved toward the Z axis direction by the linear guides 96 and 97.

The saddle 90 is rotatably supported by a bearing member 98 about the Z axis feed rod 99 by the ball screw.

A ball nut 123 is attached to the ram 120 and it is engaged with the Z axis feed screw rod 99. The Z axis feed rod 99 is connected to and rotatably driven by the Z axis servomotor 100 mounted on the saddle 90. The ram 120 is thereby moved in Z axis direction by the Z axis servomotor 100.

A pair of balance cylinder portions 101 and 102 (see FIG. 5) are attached to the saddle 90. A piston rod 103 of each of the balance cylinder portions 101 and 102 is connected to the upper end portion of the ram 120. The ram 120 is thereby suspended by a pair of the balance cylinder portions 101 and 102 and the straight movement of the ram 120 can be guaranteed by the individual operation of the balance cylinder portions 101 and 102.

(Tool Head (Swivel Head) and Tool Holder)

As shown in FIG. 8 to FIG. 13, a swivel head housing 152 is fixed under the lower end portion of the ram 120. The swivel head housing 152 rotatably supports a tool holder axis 154 about horizontal axis (B axis) by an air static pressure bearing 153. The tool holder 151 is fixedly attached to one end of the tool holder axis 154. The tool holder 151 is thereby rotatable about B axis.

The air static pressure bearing 153 has bearing bushes 156 and 157, each bush having two flanges, fixedly arranged on both the sides of the middle flange portion 155 formed at the middle portion of the tool holder axis 154. In each of the bearing bushes 156 and 157 radial air static pressure portions 158 and 159 and thrust air static pressure portions 160 and 161 are formed.

The thrust air static pressure portions 160 and 161 are arranged in oppose position to the middle flange portion 155, and have a rotary maintain mode and a clamp mode. In the rotary maintain mode an air generating an air pressure is supplied to both the thrust air static pressure portions 160 and 161. In the clamp mode the air generating the air pressure is supplied to one of the thrust air static pressure portions 160 and 161. In the rotation of the B axis (in the rotation of the tool of the tool holder) the air generating the air pressure is supplied to both the thrust air static pressure portions 160 and 161. In the clamping state of the B axis the air generating the air pressure is supplied to one of the thrust air static pressure portions 160 and 161.

The air static pressure bearing 153 acts as a tool holder clamp mechanism capable of clamping the tool holder 151 at an optional rotation angle.

A worm wheel 162 is fixedly mounted to the tool holder axis 154. A B-axis servomotor 163 is mounted in the swivel head housing 152. A worm 165 is attached to the output axis 164 of the B-axis servomotor 163. The warm 165 is engaged with the worm wheel 162 and the tool holder 151 is thereby rotatably driven at an optional rotation angle by the B-axis servomotor 163.

Four tool setting portions 166 are arranged in the tool holder 151 in radical shape and the tool holder 151 acts as a turret disc on which the four kinds of the tools T can be mounted simultaneously. In each tool setting portion 166 the setting position of the tool T in Y axis direction is finely adjusted by a wedge member 168 which can be shifted by an adjusting screw 167. Each tool T can be fixed at optional setting position in Y axis direction by a locking screw 169. Each tool setting portion 166 has an adjusting screw 170 for finely adjusting the position of the tool T in longitudinal direction thereof.

The tip of each tool T can be finely adjusted by the adjusting screws 167 and 179. This adjustment of the tip of the tool T can be performed while a user observes the tip position of the tool T with a high precision by using a microscope 63.

According to the tool head 150 having the configuration described above, it is possible to perform following processes:

The tool holder axis 154 is turned at an optional angle by the B axis servomotor under the state where the air static pressure bearing 153 (see FIG. 11) is set under the rotation maintain mode;

The tool holder axis 154 is clamped at an optional angle under the clamp mode of the air static pressure bearing 153; and Thereby, the angle of the tool T attached to the tool setting portion 166 (see FIG. 12) of the tool holder 151 can be changed according to a control signal to be transferred to the B axis servomotor 163.

Further, one of the four tools T attached on the tool setting portion 166 (see FIG. 12 and FIG. 13) can be selected by an index rotation of the tool holder axis 154 driven by the B axis servomotor 163.

(Cross Rail Support Portion)

As shown in FIG. 1 to FIG. 3, the cross rail support portion 180 is comprised of a vertical post 182 and a horizontal arm 183. The vertical post 182 is rotatably mounted about vertical axis by a post supporting body 181 arranged near the base body 10. The horizontal arm 183 is mounted at the upper end portion of the vertical post 182. A height adjusting member 184 is mounted to the tip of the horizontal arm 183.

The horizontal arm 183, designated by reference character "A" shown in FIG. 3, can be moved between a standby position and a supporting position. In the standby position designated by reference character "A" the horizontal arm 183 is separated in position from the vertical lathe body (the rotary table 30 and the cross rail 62). In the supporting position of the horizontal arm 183 designated by reference character "B" the height adjusting member 184 is engaged with an auxiliary bracket 104 fixed at the tip of the cross rail 62. Thus, the horizontal arm 183 can be turned between the standby position and the supporting position at which the height adjusting member 184 supports the auxiliary bracket 104.

Thereby, when the horizontal arm 183 is rotatably turned to the supporting position "B", the tip portion of the cross rail 62 is supported. It is thereby possible to increase an apparent rigid of the cross rail 62 during actual machining process while keeping the feature of the open side column type having a good operation performance of carrying-in and carrying-out of works to the rotary table 30.

The height adjusting member 184 is a precision jack of a fluid pressure type and an electric driving type, and whose dimension in height can be adjusted by receiving an external control signals.

(Linear Table Unit)

Figure 15:
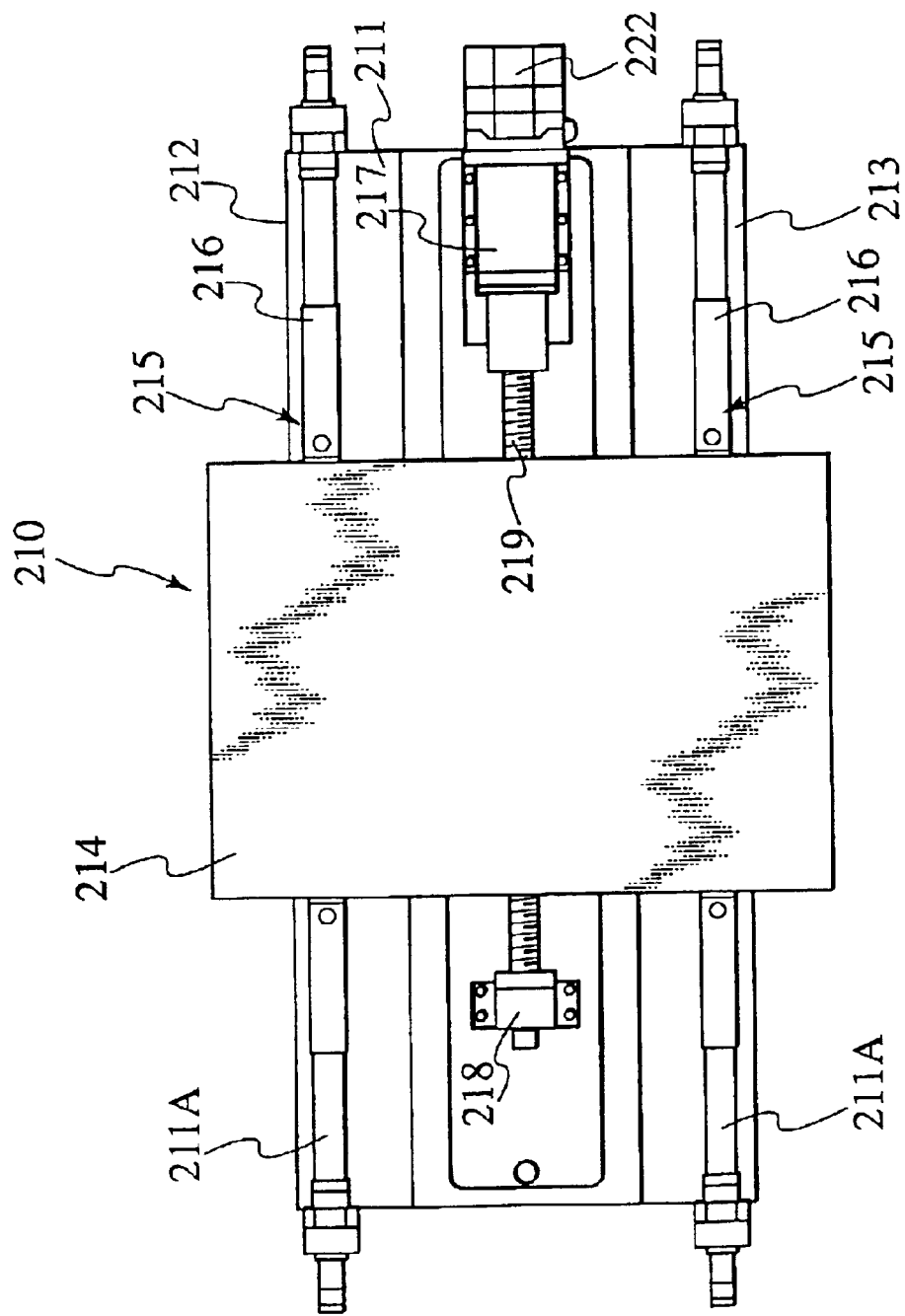
FIG. 15 is a plan view of an axis feed portion of the liner table unit for use in the vertical lathe according to an embodiment of the present invention.
Figure 16:
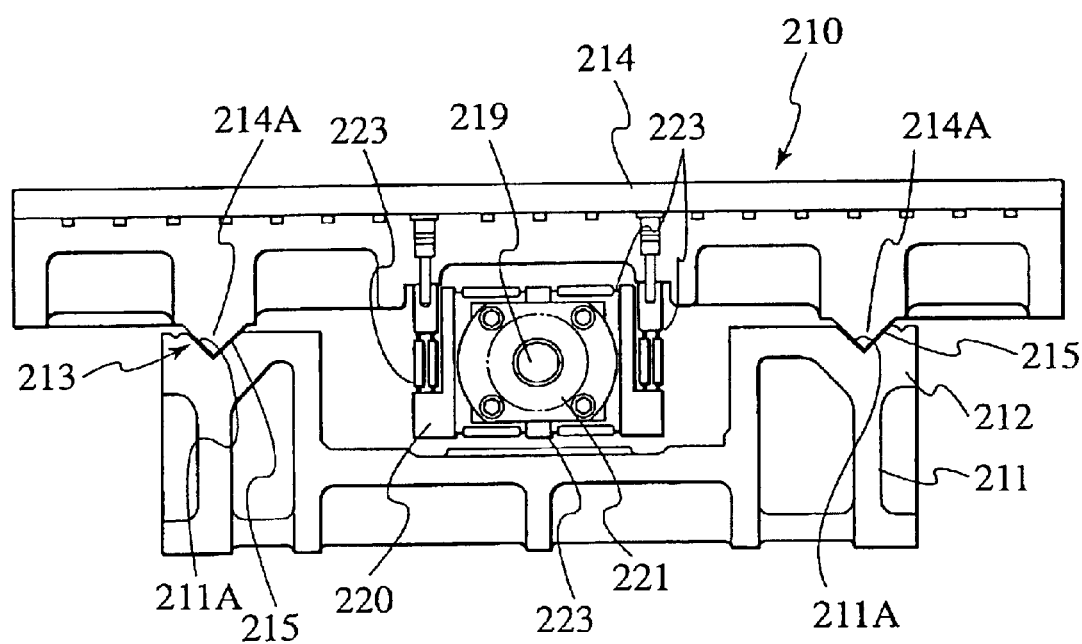
FIG. 16 is a front view of the axis feed portion of the liner table unit for use in the vertical lathe according to an embodiment of the present invention.

The linear table unit 210 is added on the rotary table 30 when performing the planing process. As shown in FIG. 14 to FIG. 16, the linear table unit 210 has a fixed base 211 releasably fixed on the rotary table 30. A pair of linear guiding portions 212 and 213 arranged in parallel to each other are formed on the fixed base 211. The linear table 214 is movably mounted in reciprocating motion on the linear guiding portions 212 and 213. The linear guiding portions in the linear table 214 in the linear guiding portions 212 and 213 is made up of a finite V—V roller guide 215.

Like the finite V—V roller guide 68 as previously mentioned, in the finite V—V roller guide 215 a plurality of needle rollers (not shown) are mounted at a same interval by a roller holding gage 216 of a V-shaped section having a predetermined length in movable direction. The finite V—V roller guide 215 is mounted between linear guiding rails 211A and 214A having V-shaped section in the fixed base 211 and the linear table 214 that are engaged with the fixed base 211 to each other. The finite V—V roller guide 215 has several features, a high rigid and a low friction in movement of the linear table 214 (in Y axis direction), and has a feature of a highly movement accuracy because it has a low infinitesimal waviness.

A feed screw rod 219 is mounted on the fixed base 211. Both ends of the feed screw rod 219 are rotatably supported by bearing brackets 217 and 218. A ball nuts 221 is mounted in the linear table 214 by a parallel spring member 220. The feed screw rod 219 is engaged with the ball nut 221. The feed screw rod 219 is connected to a servomotor 222 mounted on the fixed base 211 and driven by this servomotor 222. The linear table 214 is thereby moved in axis direction by the servomotor 222.

Figure 5:
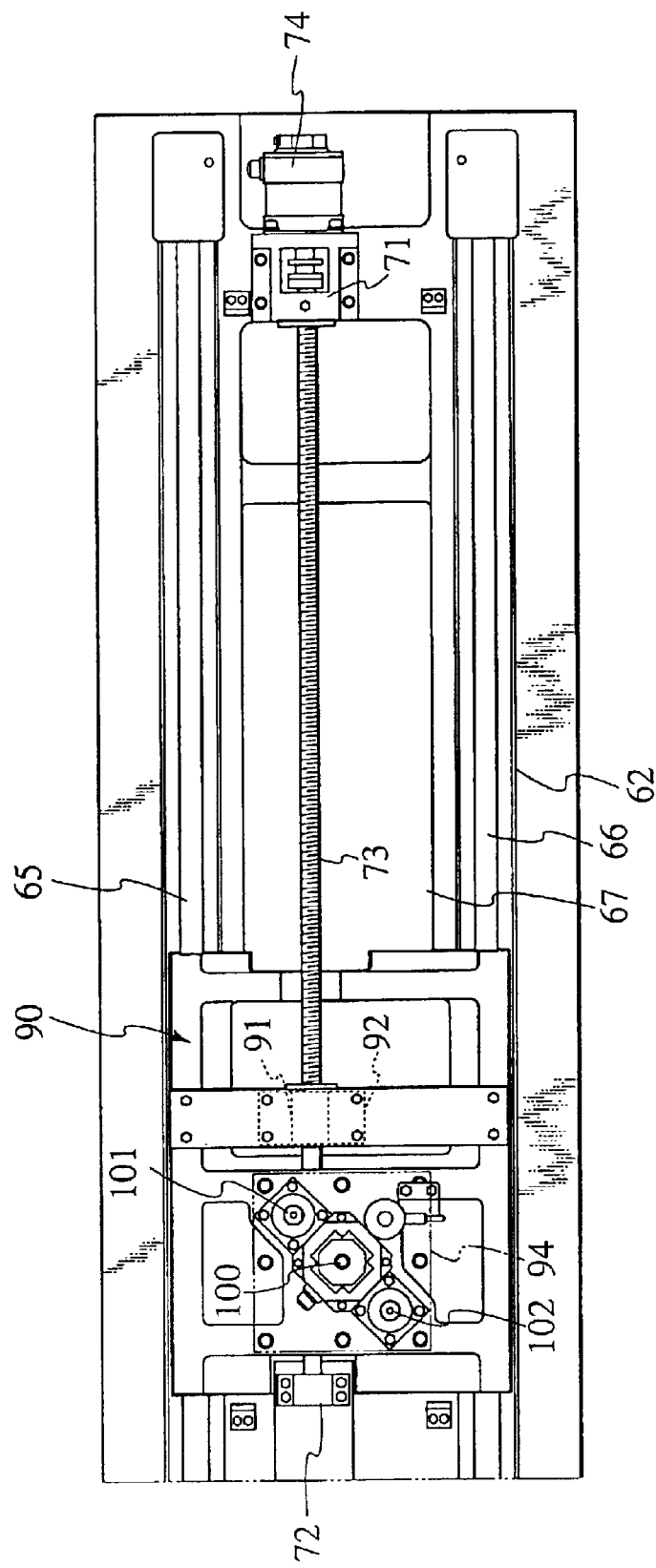
FIG. 5 is a plan view of a cross rail in the vertical lathe according to an embodiment of the present invention.
Figure 6:
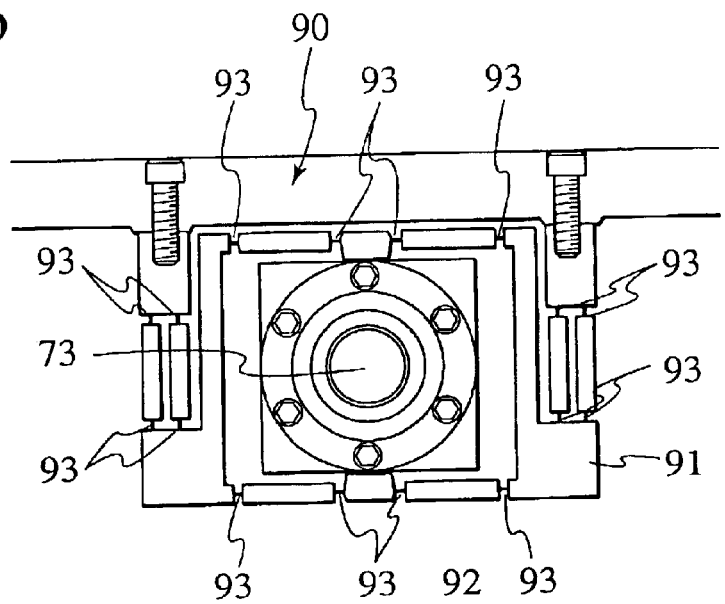
FIG. 6 is a front view of a saddle axis feed portion in the vertical lathe according to an embodiment of the present invention.
Figure 7:
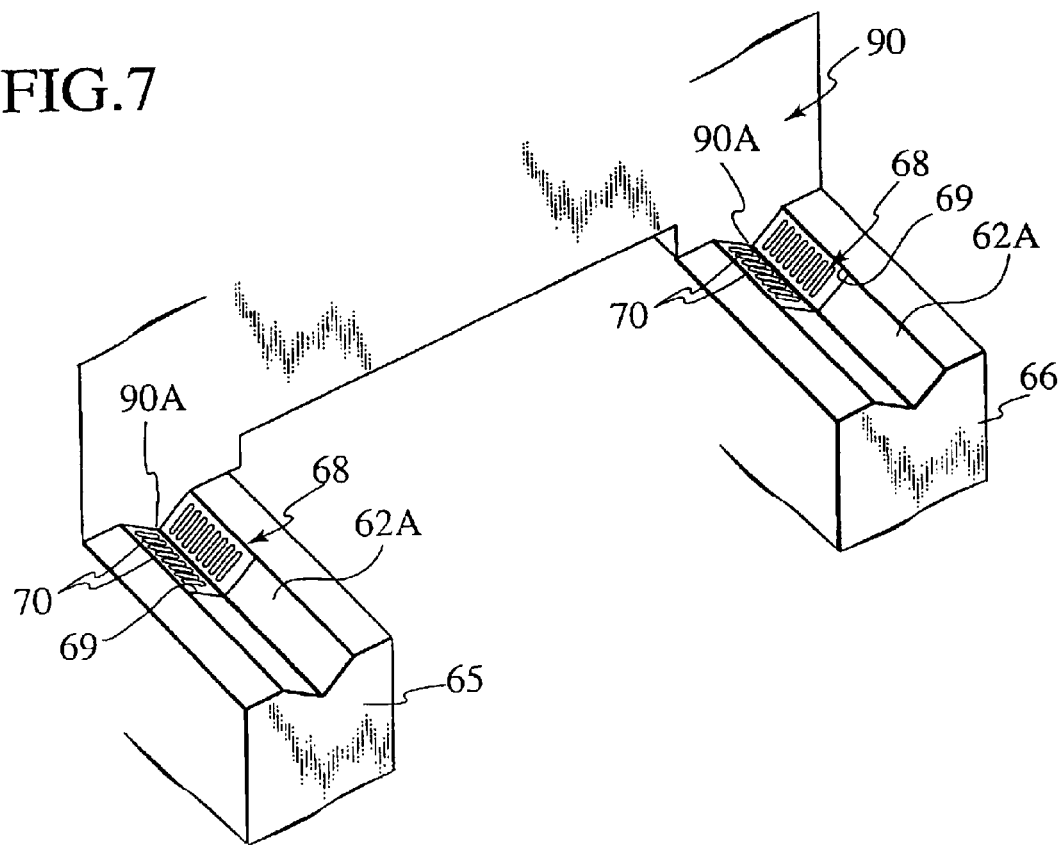
FIG. 7 is a perspective view of linear guides for the saddle in the vertical lathe according to an embodiment of the present invention.

The parallel spring member 220 is equal in function to the parallel spring member 92 as previously mentioned (see FIG. 4 to FIG. 6). The parallel spring member 220 is a kind of a flexibility coupling having a high rigid in axis feed direction by its thickness and having an elastic deformation function against a movement caused by a thin-thickness bridge portions 223. The parallel spring member 220 can absorb a bend of the ball screw and an angle misalignment between the feed screw rod 219 and the ball nut 221 and can thereby reduce the fluctuation caused by the rotation of the ball screw.

A plurality of the vacuum chuck openings 224 are formed on the upper surface of the linear table 214 in order to form a vacuum chuck by which a work material (works) is fixed by the vacuum pressure.

(Example of Use of the Vertical Lathe)

Next, a description will be given of an example of use or the vertical lathe having the configuration previously mentioned. The following example is a process to make a Fresnel lens forming die by a turning process.

(1) An operator measures the length (tool length) of the tool T attached to the tool setting portion 166 (see FIG. 12) in the tool holder 151 by using the microscope 63.

(2) The positioning between the turning center of the work material (rotation center of the rotary table 30, see FIG. 12) and the tool T attached to the tool setting portion 166 in the tool holder 151 is performed.

(3) In the state where the horizontal arm 183 in the cross rail support portion 180 (see FIG. 1) is positioned at the standby position "A" (see FIG. 3), a work material for the Fresnel lens forming die is set onto the rotary table 30 and fixed at the predetermined position by the vacuum chuck in the rotary table 30.

(4) The horizontal arm 183 in the cross rail support portion 180 is moved to the supporting position "B" (see FIG. 3) and the point end of the cross rail 62 is then supported by the height adjusting member 184. In this case, the cross rail 62 in the cross rail support portion 180 is more strongly supported by extending the height adjusting member 184 when the X axis position of the saddle 90 is more next to the tip of the cross rail 62.

(5) Under the unclamped state, the rotation angle of the tool holder 151 is adjusted by the B axis servomotor 163 (see FIG. 1), and the angle of the tool T is adjusted to the tilting angle of the lens surface (Fresnel surface) of the Fresnel lens, and the tool holder axis (B axis) 154 is then clamped. The rotary table 30 is turned at a predetermined rotation speed by the table driving motor 42 (see FIG. 3), and the X axis position of the saddle 90 is set by the X axis servomotor 74 (see FIG. 1). The ram 120 is fed in X axis direction (turning feed) by the Z axis servomotor 100 and the turning for the Fresnel lens forming die is thereby initiated.

(6) Because the tilting angle of the lens surface (Fresnel surface) of the Fresnel lens is changed according to the position in diameter of the Fresnel lens forming die, the rotation angle of the tool holder 151 is adjusted by the B axis servomotor according to the X axis position of the saddle 90, like the above case (5). The angle of the tool T is changed according to the titling angle of the lens surface (Fresnel surface) of the Fresnel lens and the rain 120 is fed in Z axis direction (turning feed) by the Z axis servomotor 100. Thereby, the turning process for the Fresnel lens forming die is performed. This turning process is performed from the center of the rotation of the rotary table 30 toward the outside thereof.

(Example of Use of the Vertical Lathe Equipped with the Linear Table Unit)

In a planing process is performed for making a Fresnel lens forming die, a front glass light guiding forming die, and the like, as shown in FIG. 1 and FIG. 14, the fixed base 211 in the linear table unit 210 is fixed on the rotary table 30. The linear guiding portions 212 and 213 are set in the axis feed direction of the linear table 214 in the linear table unit 210 by turning the rotary table 30, that is, in Y axis direction so that they are perpendicular in position to the X axis.

When this adjusting is completed, an oil generating an oil pressure is then supplied to one of the static pressure pockets 14 and 15 (see FIG. 4) in the oil static pressure bearing 11. The rotary table 30 is thereby clamped on the base body 10 by the oil pressure in the static pressure of the static pressure bearing.

The work material is set on the linear table 214 in the linear table unit 210, and clamped on the linear table 214 by the vacuum chuck of the linear table unit 214.

In the machining processes using the linear table unit 210, it is possible to perform the planing process in the changeable state of the angle of each tool by the Y axis fed of the linear table 214, the Z axis feed of the ram 120, and the B axis rotation of the tool holder axis 154.

As set forth in detail, according to the vertical lathe as an embodiment of the present invention, the vertical lathe is the open side column type in which the rotary table is turned about the vertical shaft, the saddle is moved in axis direction (X axis movement), the ram is moved in vertical axis direction (Z axis movement), the tool holder is rotatably driven at an optional rotation angle (B axis position) about the horizontal axis by the B axis servomotor, the tool holder is clamped at an optional rotation angle position by the tool holder clamp mechanism, and the tool angle can be changed by the instruction signal that is transferred to the tool holder rotation driving mechanism. Therefore it is possible to easily perform the turning process of a work material requiring the change of the tool angle, like the making of a Fresnel lens forming die.

Further, in the vertical lathe according to an embodiment of the present invention, because the saddle is supported, above the space portion formed between a pair of the linear guides, by those linear guides, and because the ram is suspended through the space portion, the weight of both the saddle and the ram is applied uniformly to a pair of the linear guides. Thereby, no eccentric load caused by the weight of them acts on the cross rail and no torsional deflection occurs in the cross rail, the movement accuracy of the saddle can be increased, and it is possible to perform a super precision turning process requiring a high-degree working precision such as the turning process of Fresnel lens forming dies and the like.

Still furthermore, according to the tool head of an embodiment of the present invention, the tool holder axis is turned at an optional angle by the servomotor, the tool holder axis is clamped at an optional rotation angle by the clamp mechanism, and the angle of each tool attached to the tool setting portion in the tool holder can be changed by the instruction signal transferred to the servomotor. It is therefore possible for the vertical lathe to easily perform the turning process with a high precision for a work material requiring the change of the angle of the tool according to the working position, like the making process of the Fresnel lens forming dies.

Moreover, according to the rotary table of an embodiment of the present invention, the rotation of the rotary driving disc is transferred to the rotary table through the torque transmission pins and the rotary table is turned by the carriet method. Therefore it is possible to suppress the occurrence of the vibration of the rotary table, to transfer the rotation power to the rotary table as a complete torque, to avoid any deviation power to the rotary table, to keep a high rotation accuracy, and to perform a super precision turning process requiring a high working precision.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A vertical lathe comprising:

a base body;

a rotary table rotatably mounted about a vertical shaft on the base body by a first rotation driving mechanism;

an upper structural body comprising a column and a cantilevered cross rail having an overhang located in parallel to the rotary table;

a saddle moveably mounted in a longitudinal direction of the cross rail and driven in an axial direction by a first axial feed mechanism;

a ram movably mounted on the saddle in a vertical direction and driven in an axial direction by a second axial feed mechanism;

a tool holder holding tools and rotatably mounted about a horizontal axis at a lower portion of the ram;

a second rotation driving mechanism to rotate the tool holder at a desired rotation angle; and a tool holder clamp mechanism clamping the tool holder at a desired rotation angle.

2. The vertical lathe according to claim 1, wherein a linear guide mechanism for the saddle is a finite V—V roller guide.

3. The vertical lathe according to claim 1, wherein the upper structural body has an integral casting configuration in which the column and the cross rail are formed in one body, and a lower end portion of the column is fixed on the base body.

4. The vertical lathe according to claim 1, wherein the cross rail comprises a pair of linear guides arranged in parallel to each other, and wherein a space portion is formed between the pair of linear guides, and both ends of the saddle are supported above the space portion by the pair of linear guides, and the ram is suspended, extending in the vertical direction through the space portion.

5. The vertical lathe according to claim 1, further comprising a microscope for detecting a tip of each tool attached to the tool holder.

6. The vertical lathe according to claim 1, further comprising:

a rotary table clamp mechanism clamping the rotary table at a desired angle position; and a linear table unit detachably mounted on the rotary table, comprising:

a fixed base detachably fixed on the rotary table; and
a linear table mounted on the fixed base, movable in reciprocal motion, and moved in an axial direction by a third axis feed mechanism.

7. The vertical lathe according to claim 1, further comprising a cross rail support portion rotatably placed about a vertical axis and selectively holding the tip end of the cross rail.

8. A vertical lathe comprising:
a rotary table arranged in horizontal direction;
a saddle movably mounted in a cross rail located in parallel to the rotary table;
a ram mounted in a vertical direction of the saddle; and
a tool holder fixed and attached to the lower end portion of the ram, wherein
the cross rail comprises a pair of linear guides arranged in parallel to each other on a front surface portion of the cross rail,
a space portion is formed between the pair of linear guides,
the saddle is supported above the space portion by the pair of the linear guides, and
the ram is suspended extending in the vertical direction through the space portion.

9. The vertical lathe according to claim 8, wherein a pair of the linear guides for the saddle is a finite V—V roller guide.

10. A vertical lathe comprising:
a base body;
a rotary table rotatably mounted about a vertical shaft on the base body by a first rotation driving mechanism;
an upper structural body comprising a column and a cross rail having an overhang located in parallel to the rotary table, wherein the upper structural body has an integral casting configuration in which the column and the cross rail are formed in one body, and a lower end portion of the column is fixed on the base body;
a saddle moveably mounted in a longitudinal direction of the cross rail and driven in an axial direction by a first axial feed mechanism;
a ram movably mounted on the saddle in a vertical direction and driven in an axial direction by a second axial feed mechanism;
a tool holder holding tools and rotatably mounted about a horizontal axis at a lower portion of the ram;
a second rotation driving mechanism driving to rotate the tool holder at a desired rotation angle; and
a tool holder clamp mechanism clamping the tool holder at a desired rotation angle.

11. A vertical lathe comprising:
a base body;
a rotary table rotatably mounted about a vertical shaft on the base body by a first rotation driving mechanism;
an upper structural body comprising a column and a cross rail having an overhang located in parallel to the rotary table;
a saddle moveably mounted in a longitudinal direction of the cross rail and driven in an axial direction by a first axial feed mechanism;
a ram movably mounted on the saddle in a vertical direction and driven in an axial direction by a second axial feed mechanism;
a tool holder holding tools and rotatably mounted about a horizontal axis at a lower portion of the ram;
a second rotation driving mechanism driving to rotate the tool holder at a desired rotation angle; and
a tool holder clamp mechanism clamping the tool holder at a desired rotation angle,
wherein the cross rail comprises a pair of linear guides arranged in parallel to each other, and wherein a space portion is formed between the pair of linear guides, and both ends of the saddle are supported above the space portion by the pair of linear guides, and the ram is suspended, extending in the vertical direction through the space portion.

12. A vertical lathe comprising:
a base body;
a rotary table rotatably mounted about a vertical shaft on the base body by a first rotation driving mechanism;
an upper structural body comprising a column and a cross rail having an overhang located in parallel to the rotary table;
a saddle moveably mounted in a longitudinal direction of the cross rail and driven in an axial direction by a first axial feed mechanism;
a ram movably mounted on the saddle in a vertical direction and driven in an axial direction by a second axial feed mechanism;
a tool holder holding tools and rotatably mounted about a horizontal axis at a lower portion of the ram;
a second rotation driving mechanism driving to rotate the tool holder at a desired rotation angle;
a tool holder clamp mechanism clamping the tool holder at a desired rotation angle;
a rotary table clamp mechanism clamping the rotary table at a desired angle position; and
a linear table unit detachably mounted on the rotary table, comprising:
a fixed base detachably fixed on the rotary table; and
a linear table mounted on the fixed base, movable in reciprocal motion,
and moved in an axial direction by a third axis feed mechanism.

13. A vertical lathe comprising:
a base body;
a rotary table rotatably mounted about a vertical shaft on the base body by a first rotation driving mechanism;
an upper structural body comprising a column and a cross rail having an overhang located in parallel to the rotary table;
a saddle moveably mounted in a longitudinal direction of the cross rail and driven in an axial direction by a first axial feed mechanism;
a ram movably mounted on the saddle in a vertical direction and driven in an axial direction by a second axial feed mechanism;
a tool holder holding tools and rotatably mounted about a horizontal axis at a lower portion of the ram;
a second rotation driving mechanism driving to rotate the tool holder at a desired rotation angle;
a tool holder clamp mechanism clamping the tool holder at a desired rotation angle; and
a cross rail support portion rotatably placed about a vertical axis and selectively holding the tip end of the cross rail.

* * * * *